United States Patent
Baig et al.

(10) Patent No.: US 10,613,877 B2
(45) Date of Patent: Apr. 7, 2020

(54) CONTAINER HYPERLINKING

(71) Applicant: INTERNATIONAL BUSINESS MACHINES CORPORATION, Armonk, NY (US)

(72) Inventors: Mirza S. Baig, Grand Prairie, TX (US); Ian R. Govett, Richmond, VT (US); Jeremy W. Chalfant, Wichita, KS (US); Robert A. Larsen, Hawthorn Woods, IL (US); Li Long Chen, Beijing (CN); Xiao Yang Zhu, Beijing (CN); Dan Lu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 15/933,990

(22) Filed: Mar. 23, 2018

(65) Prior Publication Data
US 2019/0294451 A1    Sep. 26, 2019

(51) Int. Cl.
G06F 9/44      (2018.01)
G06F 9/445     (2018.01)
(Continued)

(52) U.S. Cl.
CPC .......... *G06F 9/44521* (2013.01); *G06F 9/455* (2013.01); *G06F 9/543* (2013.01); *G06F 16/9558* (2019.01)

(58) Field of Classification Search
CPC .. G06F 16/9558; G06F 9/44521; G06F 9/455; G06F 9/543
See application file for complete search history.

(56) References Cited

U.S. PATENT DOCUMENTS 9,406,071 B2    8/2016  Liyanage et al.
9,766,912 B1    9/2017  Jorgensen
(Continued)

OTHER PUBLICATIONS

Fink, "Docker: a Software as a Service, Operating System-Level Virtualization Framework", http://journal.code4lib.org/articles/9669?utm_source=feedburner&utm_medium=feed&utm_campaign=Feed%3A+c4lj+, Code4Lib Journal 25, Jul. 21, 2014, 4 pages.
(Continued)

*Primary Examiner* — Tuan C Dao
(74) *Attorney, Agent, or Firm* — Nicholas Bowman; Andrew D. Wright; Roberts Mlotkowski Safran Cole & Calderon, P.C.

(57) ABSTRACT

Methods and systems for container hyperlinking are disclosed. A method includes: receiving, by a computing device, a request for a source container; determining, by the computing device, a plurality of recommended target containers corresponding to the source container; displaying, by the computing device, the source container and the plurality of recommended target containers; receiving, by the computing device, a request to link the source container to at least one of the plurality of recommended target containers; and executing an application by dynamically linking the source container and the at least one of the plurality of recommended target containers. Each of the plurality of recommended target containers corresponding to the source container may be determined using information about a popularity of the recommended target container.

20 Claims, 5 Drawing Sheets

(51) Int. Cl.
G06F 9/54 (2006.01)
G06F 9/455 (2018.01)
G06F 16/955 (2019.01)

(56) References Cited

U.S. PATENT DOCUMENTS

| | | | | |
|---|---|---|---|---|
| 2002/0069282 A1* | 6/2002 | Reisman | ............... | G06F 8/65 |
| | | | | 709/227 |
| 2002/0174010 A1* | 11/2002 | Rice, III | ............ | G06Q 30/02 |
| | | | | 705/14.67 |
| 2006/0047930 A1* | 3/2006 | Takahashi | ........... | G06F 3/0605 |
| | | | | 711/162 |
| 2011/0307876 A1* | 12/2011 | Ottoni | ................ | G06F 8/441 |
| | | | | 717/153 |
| 2013/0073382 A1* | 3/2013 | Henkin | ............... | G06Q 30/02 |
| | | | | 705/14.49 |
| 2017/0300352 A1 | 10/2017 | Lou et al. | | |

OTHER PUBLICATIONS

Zheng et al., "Integrating Containers into Workflows: A Case Study Using Makeflow, Work Queue, and Docker", https://pdfs.semanticscholar.org/4664/86c7459f333523ec8fccfba7e8b797506097.pdf, In Proceedings of the 8th International Workshop on Virtualization Technologies in Distributed Computing, ACM, 2015, 8 pages.
Hung et al., "GUIdock: Using Docker Containers with a Common Graphics User Interface to Address the Reproducibility of Research", http://journals.plos.org/plosone/article?id=10.1371/journal.pone.0152686, PloS one 11, No. 4, Apr. 5, 2016, 10 pages.

\* cited by examiner

CONTAINER HYPERLINKING

BACKGROUND

The present invention generally relates to computing devices and, more particularly, to methods and systems for container hyperlinking.

Container images ("containers") may be stand-alone, executable packages that include a software component (e.g., code) along with resources required to run the software component (i.e., dependencies), such as system libraries or settings. Multiple containers may be linked and run together. A YAML Ain't Markup Language (YAML) configuration file may be used to specify each of the containers to be linked and run together as well as configuration information for the containers (e.g., services, links, ports, volumes, networks, or any other parameters for configuring the containers). The YAML configuration file may then be used to start all of the linked containers.

SUMMARY

In a first aspect of the invention, there is a method that includes: receiving, by a computing device, a request for a source container; determining, by the computing device, a plurality of recommended target containers corresponding to the source container; displaying, by the computing device, the source container and the plurality of recommended target containers; receiving, by the computing device, a request to link the source container to at least one of the plurality of recommended target containers; and executing an application by dynamically linking the source container and the at least one of the plurality of recommended target containers.

In another aspect of the invention, there is a computer program product that includes a computer readable storage medium having program instructions embodied therewith. The program instructions are executable by a computing device to cause the computing device to: display a plurality of containers and links between the plurality of containers; receive a selection of a container from the plurality of containers; and in response to receiving the selection of the container, displaying a plurality of recommended containers from the plurality of containers.

In another aspect of the invention, there is a system that includes: a hardware processor, a computer readable memory, and a computer readable storage medium associated with a computing device; program instructions of a source container request receiver configured to receive a request for a source container; program instructions of a container recommender configured to determine a plurality of recommended target containers corresponding to the source container associated with the request received by the source container request receiver; and program instructions of a container displayer configured to display the source container and the plurality of recommended target containers determined by the container recommender, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
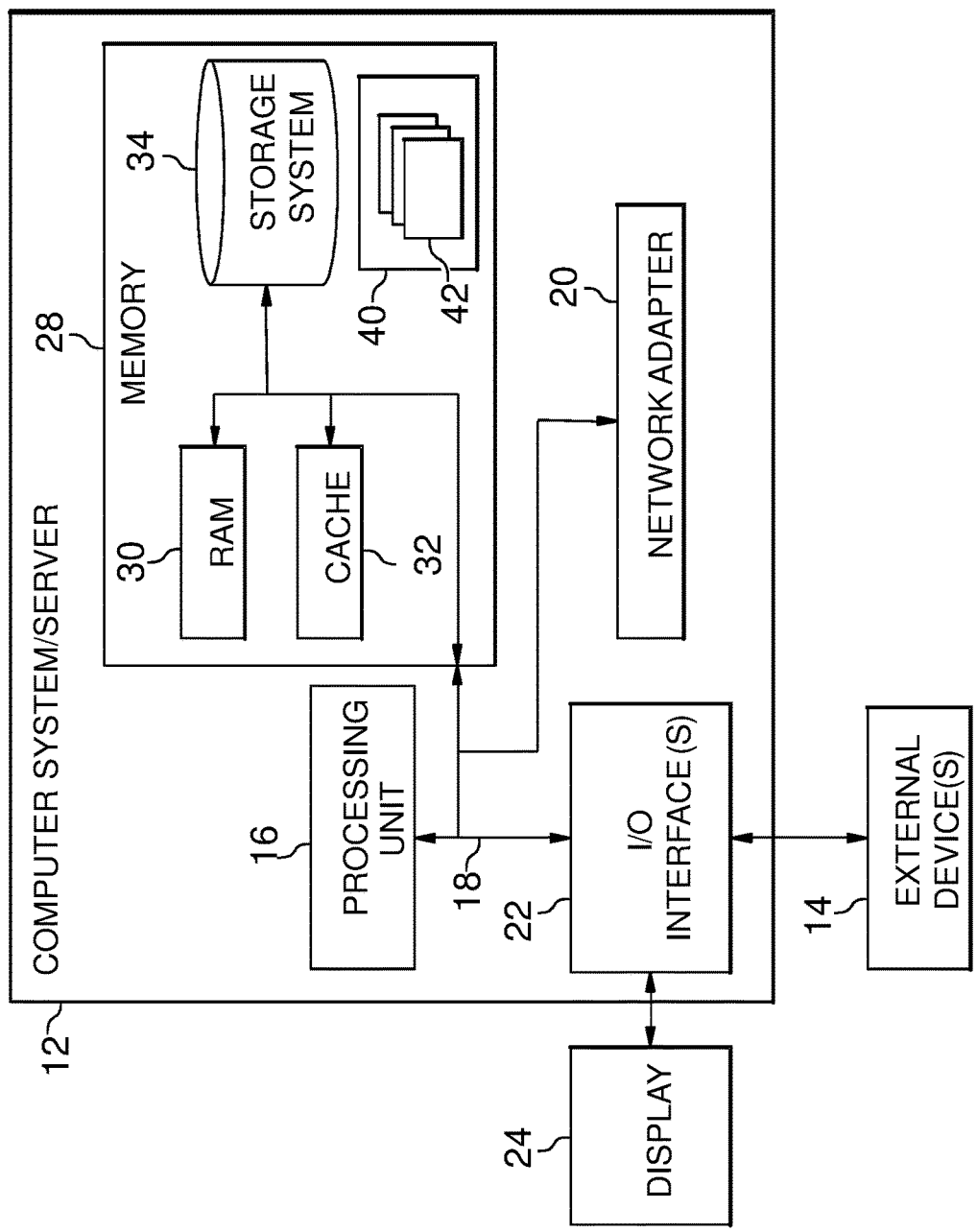
FIG. 1 depicts a computer system in accordance with aspects of the invention.

The present invention generally relates to computing devices and, more particularly, to methods and systems for container hyperlinking. YAML configuration files provide a way for a user to bring up an application with multiple components running in different containers. However, several limitations are inherent in the use of YAML configuration files. In particular, with YAML configuration files, links between containers and parameters (e.g., environment variables) must be predefined and cannot be changed at runtime, and therefore the approach lacks flexibility. Additionally, the YAML configuration files are usually stored and used on a local server and therefore are not easily sharable and reusable. Furthermore, it is not possible to discover links among containers that have been created by others and route to the right containers, and therefore the approach is inefficient and not scalable.

Aspects of the invention address these limitations and improve flexibility, resilience, scalability, and collaboration by enabling dynamic links among containers as well as social filtering and ranking. As described herein, aspects of the invention include determining connections between containers at runtime using a Hypertext Markup Language (HTML)-like syntax based on service discovery and routing. Additionally, as described herein, the links among containers may be searchable and ratable, enabling a collaborative project environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
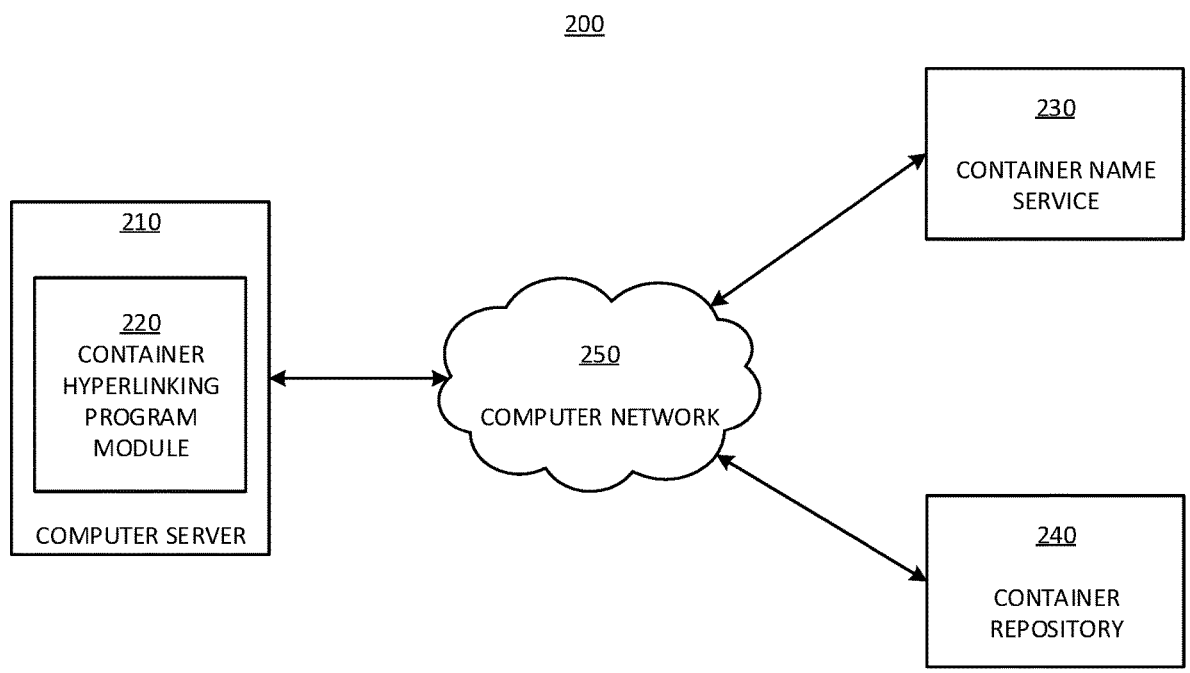
FIG. 2 depicts an illustrative environment in accordance with aspects of the invention.

FIG. 2 depicts an illustrative environment 200 in accordance with aspects of the invention. As shown, the environment 200 comprises a computer server 210 which is in communication with a container name service 230 and a container repository 240 via a computer network 250. The computer network 250 may be any suitable network such as a LAN, WAN, or the Internet. The computer server 210, the container name service 230, and the container repository 240 may be physically collocated, or may be situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 may be a computer server 12 as shown in FIG. 1. The computer server 210 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 may include a container hyperlinking program module 220, which may include hardware and/or software and may be one or more of the program modules 42 shown in FIG. 1. According to an embodiment, the container hyperlinking program module 220 includes program instructions for determining connections between containers at runtime using a HTML-like syntax based on service discovery and routing. The program instructions included in the container hyperlinking program module 220 of the computer server 210 may be executed by one or more hardware processors. According to an embodiment, the container hyperlinking program module 220 performs functions related to receiving a request to bring up an application or service, starting source and target containers, parsing hyperlinks defined in an application or service template, identifying source and target container instances, and connecting source and target container instances based on dynamic routing.

Still referring to FIG. 2, in embodiments, the container name service 230 may be a computer server 12 as shown in FIG. 1. The container name service 230 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, when a new container instance is created or launched, for example, by the dynamic router 350 as described herein, the container instance is registered with the container name service 230. The container name service 230 may also function to identify existing container instances that have been previously registered with the container name service 230. Accordingly, the container name service 230 may provide information for connecting a correct container instance (e.g., a container instance with a specified version) when a hyperlink definition is parsed, either in response to loading a link, a request for a new link, or a request to edit an existing link. The container name service 230 may be hosted by or provided by a third party. For example, the container name service 230 may be provided as a web service.

Still referring to FIG. 2, in embodiments, the container repository 240 may be a computer server 12 as shown in FIG. 1. The container name service 230 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, a plurality of containers may be stored in the container repository 240. The containers in the container repository 240 may include containers that are created, maintained, or owned by one or more third parties (e.g., third party individuals, groups, teams, companies, academic institutions, etc.). The container repository 240 may be hosted by or provided by a third party. For example, the container repository 240 may be provided as a web service. The container repository 240 may also store links connecting containers in association with the linked containers as well as information about the popularity of containers and/or links.

Figure 3:
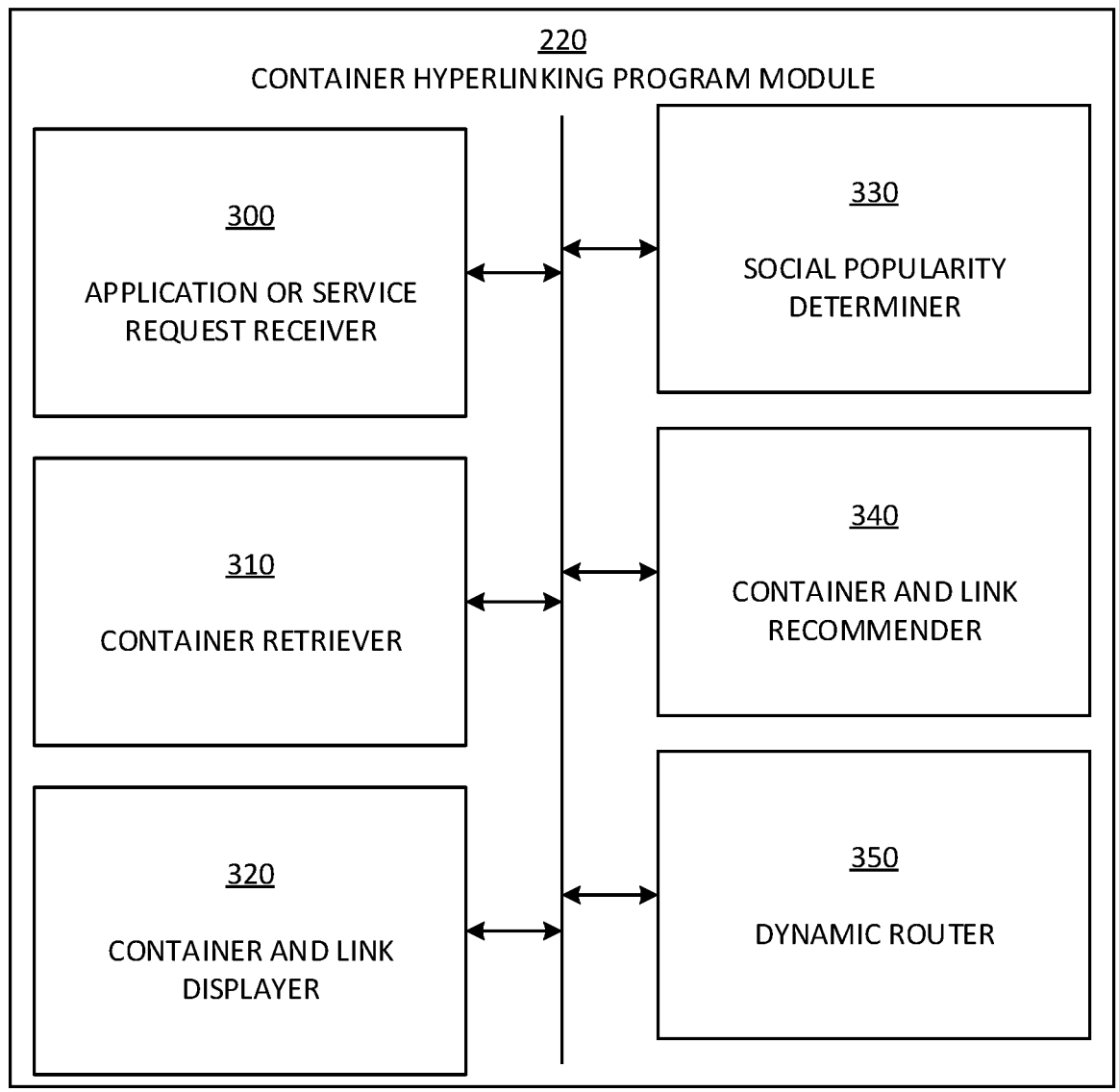
FIG. 3 depicts a block diagram of an exemplary program module in accordance with aspects of the invention.

FIG. 3 depicts a block diagram of an exemplary container hyperlinking program module 220 in the server 210 (of FIG. 2) in accordance with aspects of the invention. In embodiments, the container hyperlinking program module 220 includes an application or service request receiver 300, a container retriever 310, a container and link displayer 320, a social popularity determiner 330, a container and link recommender 340, and a dynamic router 350, each of which may comprise one or more program modules 42 as described with respect to FIG. 1. In embodiments, the container hyperlinking program module 220 may include additional or fewer components than those shown in FIG. 3. In embodiments, separate components may be integrated into a single computing component or module. Additionally, or alternatively, a single component may be implemented as multiple computing components or modules.

In embodiments, the application or service request receiver 300 receives, from a user, a request to bring up an application or service. The request may include the name of a source container that implements the requested application or service. The source container may be stored in the container repository 240. The application or service request receiver 300 determines whether or not links between the source container and other containers stored in the container repository 240 or other locations have been defined in a template stored in the container repository 240 in association with the source container that implements the requested application or service.

In embodiments, in response to the application or service request receiver 300 receiving the request, the container retriever 310 retrieves, from the container repository 240, information about a plurality of containers stored therein, including information about the source container that implements the application or service associated with the request. This information may include names and tags associated with each of a plurality of containers stored in the container repository 240. The tags may identify keywords associated with and technologies supported by each of the plurality of containers stored in the container repository 240. The container retriever 310 may also retrieve links and information about the popularity of each of the plurality of containers stored in the container repository 240.

According to embodiments, the container retriever 310 may retrieve a predetermined number of containers from the container repository 240 that are selected based upon the information about the popularity of each of the plurality of containers stored in the container repository 240. Alternatively, or additionally, the container retriever 310 may select containers to retrieve based upon a match between a keyword identified by a tag associated with the source container that implements the requested application or service and a keyword identified by a tag associated with a container in the container repository 240, or based on a match between a supported technology associated with the source container and a supported technology associated with a container in the container repository 240.

In embodiments, the container and link displayer 320 may cause the containers retrieved by the container retriever 310 to be displayed by the computer server 210 or a user's computing device. The containers may be displayed as container hyperlinks that are clickable or otherwise selectable by a user. If the application or service request receiver 300 determines that links between the requested container and other containers have not been defined, then the source container that implements the requested application or service may be preselected and links recommended by the container and link displayer 320, as described below, may be displayed by the container and link displayer 320.

In response to a container hyperlink being clicked or selected by a user, the container and link displayer 320 may cause the container and link recommender 340 to recommend other containers and links thereto. In particular, the container and link recommender 340 may cause the container retriever 310 to retrieve additional containers from the container repository 240 that share a tagged keyword with the clicked or selected container or that have been previously linked with the clicked or selected container as indicated by link information stored in the container repository 240.

The container and link recommender 340 may query the social popularity determiner 330 to determine a popularity level of each of a plurality of containers retrieved by the container retriever 310 and having a tagged keyword that matches a tagged keyword for the clicked or selected container. The social popularity determiner 330 may retrieve from the container repository 240 a popularity level with respect to a frequency of use of the container having the matching keyword in conjunction with the clicked or selected container (e.g., a frequency of linking between the clicked or selected container and the container having the matching keyword). The container and link recommender 340 may then select a predetermined number of containers having one or more keywords matching a keyword of the clicked or selected container and cause the container and link displayer 320 to present the selected containers on a display as recommended links, optionally ordered by popularity level.

The container and link displayer 320 may then receive from a user a selection of a desired target container from the recommended links presented on the display. The selected target container may then be connected to the previously clicked or selected container (e.g., source container) at runtime by the dynamic router 350.

In embodiments, the dynamic router 350 may use the container name service 230 to identify an instance of the source container and the target container and then create a dynamic link therebetween, for example, at runtime. If the dynamic router 350 determines that there is no running instance of the source container or the target container, the dynamic router 350 may create an instance of the source and/or target containers, register the instances with the container name service 230, and dynamically link between the source and the target container.

Figure 4:
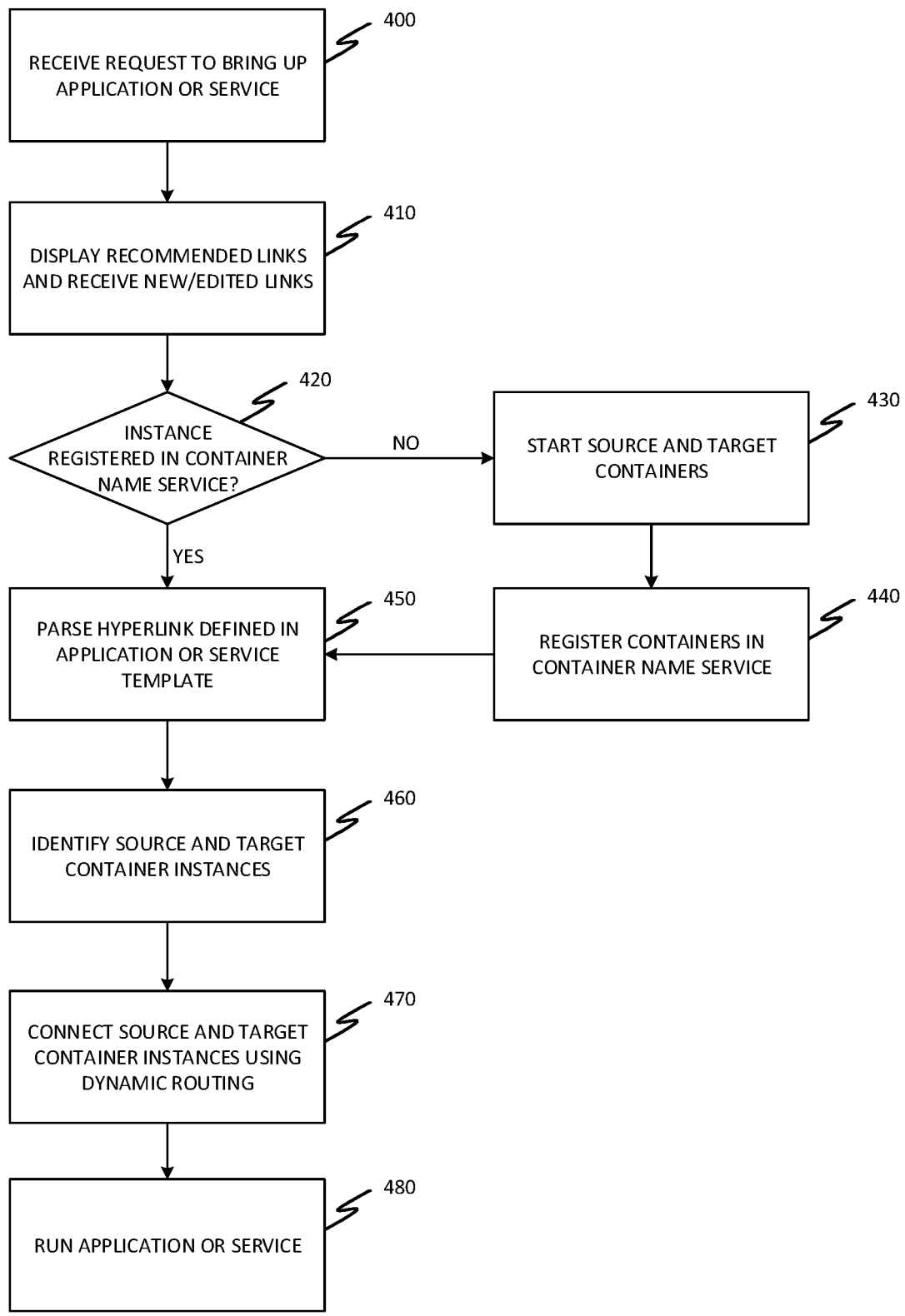
FIG. 4 depicts exemplary methods in accordance with aspects of the invention.

FIG. 4 depicts a flowchart of an exemplary method in accordance with aspects of the invention. The steps of the method may be performed in the environment of FIG. 2 and are described with reference to the elements and steps described with respect to FIGS. 1, 2, and 3.

At step 400, the system receives a request to bring up an application or service. In embodiments, as described with respect to FIG. 3, step 400 comprises the application and service request receiver 300 receiving the request to bring up the application or service, including the name of a source container that implements the requested application or service, and the container retriever 310 retrieving from the container repository 240 information about the source container.

At step 410, the system displays recommended links between the source container and target containers and receives new/edited links. In embodiments, as described with respect to FIG. 3, step 410 comprises the container and link displayer 320 determining whether or not links between the source container and other containers (e.g., target containers) have been defined in a template associated with the requested application or service. Such a template may be stored in the container repository 240 or any other location accessible to the container hyperlinking program module 220 including the application and service request receiver 300 and may be retrieved by the container retriever 310.

If links have been defined in the template, the container and link displayer 320 may display the source container and any linked target containers, as well as the links therebetween. The container and link displayer 320 may cause the container and link recommender 340 to provide a predetermined number of recommended containers from the container repository 240 for display by the container and link displayer 320.

The container and link recommender 340 may cause the container retriever 310 to retrieve a predetermined number of recommended containers from the container repository 240 that are selected based upon information about the popularity of each of the plurality of containers stored in the container repository 240 as determined by the social popularity determiner 330 and/or a match between a keyword identified by a tag associated with the source container and a keyword identified by a tag associated with the recommended container. These recommended containers may then be displayed by the container and link displayer 320.

The container and link displayer 320 may receive from a user a selection of a target container (or, in the case of a link having been defined in the template, an additional target container) to which a link is to be created from the source container. Alternatively, if links have been defined in the template, the container and link displayer 320 may receive from a user a selection of a link to modify. For example, a link may be changed to point to a different target container, or a link may be deleted. The link information may be stored in a hyperlink format and may be stored in the container repository 240 in association with the source container and/or target container.

At step 420, the system determines whether or not an instance of each of the source container and the one or more target containers linked in step 410 are registered in the container name service 230. In embodiments, as described with respect to FIG. 3, step 420 comprises the dynamic router 350 using the container name service 230 to determine whether or not there is an instance of the source container that implements the requested application or service and the linked target containers. The links may also include information about a requirement for a particular version of the source and/or target containers, which may be used by dynamic router 350 in interrogating the container name service 230 to determine whether or not a required container instance exists.

If it is determined in step 420 that an instance of the source container that implements the application or service requested in step 400 and the one or more target containers linked in step 410 is not registered in the container name service 230, then the flow proceeds to step 430. On the other hand, if it is determined in step 420 that the instance of the source container and an instance of each of any target containers are registered in the container name service 230, then the flow proceeds to step 450.

At step 430, the system starts an instance of the source container that implements the application or service requested in step 400 and an instance of each of any target containers defined in a template associated with the source container that are not already registered with the container name service 230. In embodiments, as described with respect to FIG. 3, step 430 comprises the dynamic router 350 creating the instance of the source and/or target containers.

At step 440, the system then registers each of the container instances started in step 430 with the container name service 230. In embodiments, as described with respect to FIG. 3, step 440 comprises the dynamic router 350 registering the container instances with the container name service 230. For example, a name of a container instance and version information associated with the container instance may be registered with the container name service 230.

At step 450, the system parses a hyperlink defined in a template associated with the requested application or service. In embodiments, as described with respect to FIG. 3, step 450 comprises the dynamic router 350 retrieving the link information retrieved, modified, and/or created in step 410 and determining the source container and target containers from the link information.

At step 460, the system identifies source and target container instances. In embodiments, as described with respect to FIG. 3, step 460 comprises the dynamic router 350 using the container name service 230 to identify the source container and target containers determined in step 450.

At step 470, the system connects the source and target container instances identified in step 460 using dynamic routing. In embodiments, as described with respect to FIG. 3, step 470 comprises the dynamic router 350 dynamically linking the source container and target containers identified by the container name service 230.

At step 480, the system runs the application or service. In embodiments, as described with respect to FIG. 3, step 480 comprises the dynamic router 350 causing the dynamically linked source container and target containers to be executed by the system.

Figure 5:
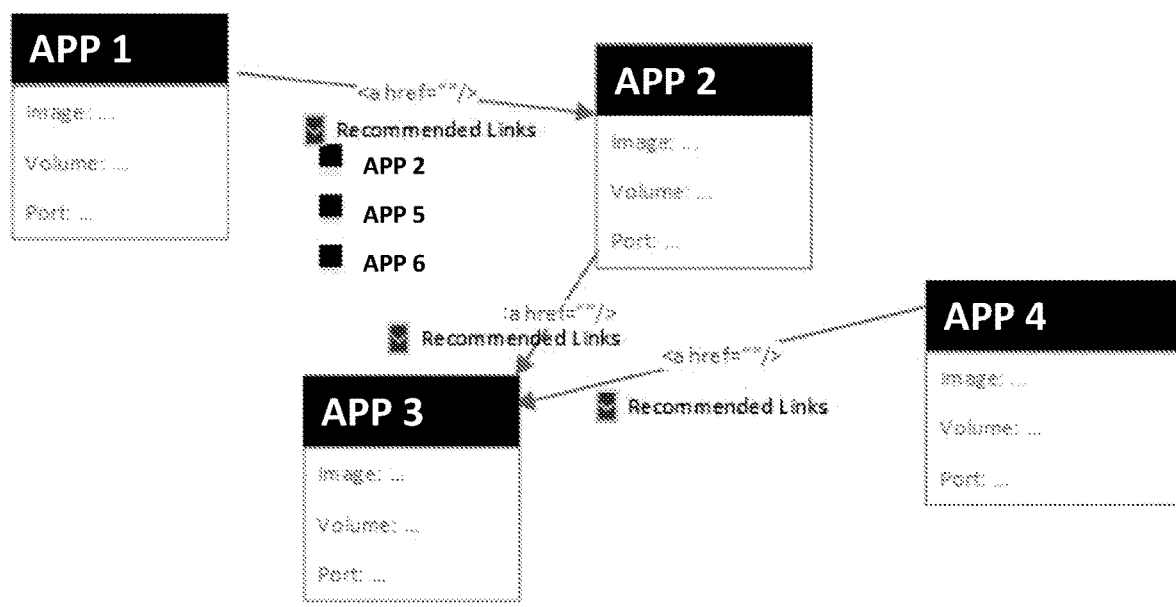
FIG. 5 depicts an example of the system in operation in accordance with aspects of the invention.

FIG. 5 depicts an example of the system in operation in accordance with aspects of the invention. In the example illustrated in FIG. 5, a request may be received from a user to bring up the APP 1 application. In response to receiving this request, the system may display a plurality of recommended links between the APP 1 container associated with the APP 1 application and other containers, including recommended links to APP 2, APP 5, and APP 6. In response to receiving from a user a selection of APP 2 as a target container from the list of recommended links, the system may link the APP 1 container to the APP 2 container. Similarly, in response to receiving from the user a selection of the APP 2 container, the system may display a plurality of recommended links, including a recommended link to APP 3. In response to receiving from the user a selection of APP 3 as a target container from the list of recommended links, the system may link the APP 2 container to the APP 3 container. Additionally, in the example illustrated in FIG. 5, a request may be received from the user to bring up the APP 4 application. In response to receiving this request, the system may display a plurality of recommended links, including a recommended link to APP 3. In response to receiving from the user a selection of APP 3 as the target container from the list of recommended links, the system may link the APP 4 container to the APP 3 container.

Accordingly, the system improves the functioning of a computer by providing for dynamic links between source and target containers. Additionally, the system improves the functioning of a computer by providing for the automatic recommendation of target containers based upon a selected source container and popularity ratings for potential target containers in a container repository. These dynamic linking and social recommendation features of the system result in improved system scalability and efficiency.

Aspects of the invention address these limitations and improve flexibility, resilience, scalability, and collaboration by enabling dynamic links among containers as well as social filtering and ranking. As described herein, aspects of the invention include determining connections between containers at runtime using a Hypertext Markup Language (HTML)-like syntax based on service discovery and routing. Additionally, as described herein, the links among containers may be searchable and ratable, enabling a collaborative project environment.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, a request for a source container;
   determining, by the computing device, a plurality of recommended target containers corresponding to the source container;
   displaying, by the computing device, the source container and the plurality of recommended target containers;
   receiving, by the computing device, a request to link the source container to at least one of the plurality of recommended target containers; and
   executing an application by dynamically linking the source container and the at least one of the plurality of recommended target containers at runtime by parsing a hyperlink, identifying instances of the source container and the at least one of the plurality of recommended target containers, and connecting the instances of the source container and the at least one of the plurality of recommended target containers based on dynamic routing.

2. The method according to claim 1, wherein each of the plurality of recommended target containers corresponding to the source container is determined using information about a popularity of the recommended target container.

3. The method according to claim 1, further comprising receiving a template associated with the source container, the template including at least one link between the source container and at least one linked target container.

4. The method according to claim 3, wherein the at least one linked target container is included in the plurality of recommended target containers.

5. The method according to claim 4, wherein the displaying the source container and the plurality of recommended target containers comprises displaying the at least one link.

6. The method according to claim 5, wherein the request to link from the source container to at least one of the plurality of recommended target containers comprises a request to change the at least one link to link to a different target container selected from the plurality of recommended target containers.

7. The method according to claim 1, wherein each of the plurality of recommended target containers corresponding to the source container are determined based on a match between a keyword associated with the source container and a keyword associated with the recommended target container.

8. The method according to claim 1, further comprising registering name and version information of each container instance at launch with a container name service, including an instance of the source container and an instance of each of the at least one of the plurality of recommended target containers.

9. The method according to claim 8, wherein the hyperlink includes information about a requirement for a particular version of each of the at least one of the plurality of recommended target containers.

10. The method according to claim 9, further comprising interrogating the container name service using the information about the requirement for the particular version of each of the at least one of the plurality of recommended target container to determine whether or not an instance of a required version of the recommended target container exists.

11. The method according to claim 10, wherein:
the container name service is a web service,
the interrogating the container name service results in determining that the instance of the required version of the recommended target container exists, and
further comprising dynamically linking the source container and the instance of the required version of the recommended target container at runtime.

12. A computer program product comprising a computer readable storage medium having program instructions embodied therewith, the program instructions executable by a computing device to cause the computing device to:
display a plurality of containers and links between the plurality of containers;
receive a selection of a first container from the plurality of containers;
in response to receiving the selection of the first container, display a plurality of recommended containers from the plurality of containers;
receive a request to link from the first container to at least one of the plurality of recommended containers; and
execute an application by dynamically linking the first container and the at least one of the plurality of recommended containers at runtime by parsing a hyperlink, identifying instances of the first container and the at least one of the plurality of recommended containers, and connecting the instances of the first container and the at least one of the plurality of recommended containers based on dynamic routing.

13. The computer program product according to claim 12, wherein each of the plurality of recommended containers is determined using information about a popularity of the recommended container.

14. The computer program product according to claim 12, the program instructions further causing the computing device to receive a template associated with at least one of the plurality of containers, the template including at least one of the links between the plurality of containers.

15. The computer program product according to claim 12, wherein the request to link from the first container to the at least one of the plurality of recommended containers comprises a request to change one of the links to a different target container selected from the plurality of recommended containers.

16. The computer program product according to claim 12, wherein each of the plurality of recommended containers is determined based on a match between a keyword associated with the first container and a keyword associated with the recommended container.

17. A system comprising:
a hardware processor, a computer readable memory, and a computer readable storage medium associated with a computing device;
program instructions of a source container request receiver configured to receive a request for a source container;
program instructions of a container recommender configured to determine a plurality of recommended target containers corresponding to the source container associated with the request received by the source container request receiver;
program instructions of a container displayer configured to display the source container and the plurality of recommended target containers determined by the container recommender;
program instructions of a link request receiver configured to receive a request to link from the source container to at least one of the plurality of recommended target containers displayed by the container displayer; and
program instructions of a dynamic router configured to execute an application by dynamically linking the source container and the at least one of the plurality of recommended target containers at runtime by parsing a hyperlink, identifying instances of the source container and the at least one of the plurality of recommended target containers, and connecting the instances of the source container and the at least one of the plurality of recommended target containers based on dynamic routing, in response to the link request receiver receiving the request to link,
wherein the program instructions are stored on the computer readable storage medium for execution by the hardware processor via the computer readable memory.

18. The system according to claim 17, wherein the container recommender is configured to determine each of the plurality of recommended target containers using information about a popularity of the recommended target container.

19. The system according to claim 17, wherein the container recommender is configured to determine each of the plurality of recommended target containers based on a match between a keyword associated with the source container and a keyword associated with the recommended target container.

20. The system according to claim 17, wherein the link request receiver is further configured to store a link corresponding to the received request to link with the source container in a code repository.

* * * * *